(12) United States Patent
Gotoh et al.

(10) Patent No.: US 6,788,876 B1
(45) Date of Patent: Sep. 7, 2004

(54) INFORMATION RECORDING MEDIUM, INFORMATION RECORDING/ REPRODUCTION SYSTEM APPARATUS, AND INFORMATION RECORDING/ REPRODUCTION METHOD

(75) Inventors: Yoshiho Gotoh, Osaka (JP); Kaoru Murase, Nara (JP); Yoshihisa Fukushima, Osaka (JP); Tomoyuki Okada, Katano (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 815 days.

(21) Appl. No.: 09/603,776

(22) Filed: Jun. 26, 2000

(30) Foreign Application Priority Data

Jun. 28, 1999 (JP) .......................................... 11-181031

(51) Int. Cl.[7] .............................................. H04N 5/91
(52) U.S. Cl. .......................... 386/65; 386/95; 386/125; 386/126
(58) Field of Search .............................. 386/46, 95, 98, 386/52, 55, 65, 111, 112, 125, 126, 105

(56) References Cited

U.S. PATENT DOCUMENTS 5,813,010 A * 9/1998 Kurano et al. ............... 707/100
6,148,140 A * 11/2000 Okada et al. ................ 386/105
6,577,812 B1 * 6/2003 Kikuchi et al. .............. 386/105

FOREIGN PATENT DOCUMENTS

EP          000866456 A1 *  9/1998

* cited by examiner

Primary Examiner—Huy Nguyen
(74) Attorney, Agent, or Firm—Renner, Otto, Boisselle & Sklar, LLP (57) ABSTRACT

An information recording medium of the present invention is an information recording medium in which data is recorded by using a data structure, the data structure including a file structure area and a data area. The data includes first AV data having a first attribute and second AV data having a second attribute which is different from the first attribute. The data area has continuous areas. At least one of the continuous areas includes a first extent in which at least a portion of the first AV data is recorded and a second extent in which at least a portion of the second AV data is recorded.

6 Claims, 9 Drawing Sheets

INFORMATION RECORDING MEDIUM, INFORMATION RECORDING/REPRODUCTION SYSTEM APPARATUS, AND INFORMATION RECORDING/REPRODUCTION METHOD

BACKGROUND OF THE INVENTION

1. Field of the Invention

The present invention relates to an information recording medium, an information recording/reproduction system apparatus and an information recording/reproduction method for managing AV (audio/video) data by using a file structure.

2. Description of the Related Art

An optical disk is a type of information recording medium which has a sector structure. In recent years, the recording density and the capacity of an optical disk have been increased, and optical disks usable in multimedia applications have been developed. Accordingly, it has become important to increase the access speed so that it is possible to interactively reproduce data using a plurality of data sets. A DVD-video disk has been developed as an optical disk capable of interactively reproducing video titles. A DVD-video disk contains AV data which includes a plurality of MPEG program streams and control data which is used for controlling the reproduction of the AV data.

Referring to a directory structure illustrated in FIG. 9 and a data structure illustrated in FIG. 10, the structure of directories recorded on a DVD-video disk and the relationship between the AV data and the control data will now be described by way of an example. A DVD-video file 908 is recorded using a predetermined file name under a predetermined directory so that a DVD player can easily access data. In particular, a video directory 902 is created under a root directory 901.

The DVD-video file 908 includes AV data 907 and control data 906. The AV data 907 and the control data 906 are recorded under the video directory 902. In particular, the AV data 907 is recorded as a file 904 named "Video.AVD", and the control data 906 therefor is recorded as a file 903 named "Video.IFO". A file 905 named "File-A.DAT", which is used in personal computers, and the like, is recorded in a location other than under the video directory 902. Therefore, the DVD player will not erroneously reproduce PC data.

Typically, the AV data 907 includes a plurality of video objects (hereinafter, referred to as "VOBs"). In the example illustrated in FIG. 10, the AV data 907 includes VOB 1009 and VOB 1010. The VOB 1009 and the VOB 1010 are both VOBs but differ from each other in terms of the conditions under which video data and audio data represented by the VOBs are compressed or encoded. For example, the VOB 1009 may be AV data of a news program which has been compressed by the MPEG1 data compression scheme, while the VOB 1010 may be AV data of a live baseball program which has been compressed by the MPEG2 data compression scheme. The control data 906 includes a program 1011 for controlling the reproduction of the AV data 907 and VOB management information 1012 which is used for managing the information of each VOB. The program 1011 includes a program 1001 for controlling the reproduction of the VOB 1009 and a program 1002 for controlling the reproduction of the VOB 1010. The programs 1001 and 1002 each specify a reproduction start address 1005 and a reproduction end address 1006 of the VOB. The reproduction start address 1005 and the reproduction end address 1006 are specified, respectively, by identification information of each of the VOBs 1009 and 1010 of the AV data 907 and the number of relative bytes with respect to the leading address of each of the VOBs 1009 and 1010. In the example illustrated in FIG. 10, the programs 1001 and 1002 are registered. The program 1001 is programmed to reproduce a portion 1007 of the VOB 1009, and the program 1002 is programmed to reproduce a portion 1008 of the VOB 1010. Thus, program data (a VOB) can be partially reproduced by specifying the reproduction start address and the reproduction end address of the VOB. VOB management information 1012 includes VOB management information 1003 for managing the information of the VOB 1009 and VOB management information 1004 for managing the information of the VOB 1010. Each of the VOB management information 1003 and 1004 includes various information for the VOB such as the type of TV broadcasting system, the resolution, the number of channels for audio data, the compression schemes for video data and audio data, information used for performing a search by specifying the time of AV data, information used for managing location information by GOPs (groups of pictures) defined in MPEG, and the data size of the VOB. A DVD-video disk having recorded thereon information which has the directory structure illustrated in FIG. 9 and the data structure illustrated in FIG. 10 is reproduced as follows. Application software can read out the control data 906 and interactively reproduce a plurality of VOBs by using a predefined program.

Figure 7A:
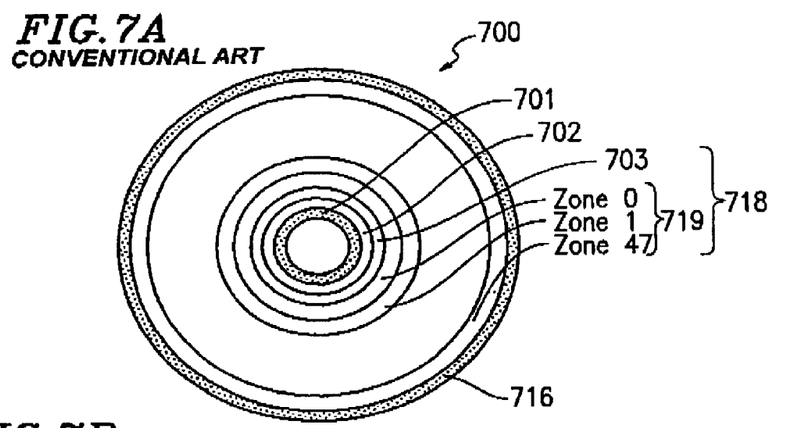
FIGS. 7A and 7B are diagrams illustrating a physical structure of a conventional information recording medium.

Referring to FIGS. 7A and 7B, the relationship between the physical structure of a DVD-RAM disk 700, which is a rewritable optical disk, and the logical volume space thereof will now be described. FIG. 7A illustrates the physical structure of the DVD-RAM disk 700. The DVD-RAM disk 700 includes a lead-in area 701, a DMA (defect management area) 702 for managing defects on the disk 700, a data area 718, and a lead-out area 716 which are arranged in this order from the inner periphery to the outer periphery of the DVD-RAM disk 700. Digital data is recorded in each of these areas, and the digital data is managed by a unit called a "sector". The data area 718 includes a spare area 703 used for replacing defective sectors and an area 719 including a plurality of zones numbered from zone 0 to zone 47. In each zone, data is recorded in blocks of 2048-byte physical sectors.

Figure 7B:
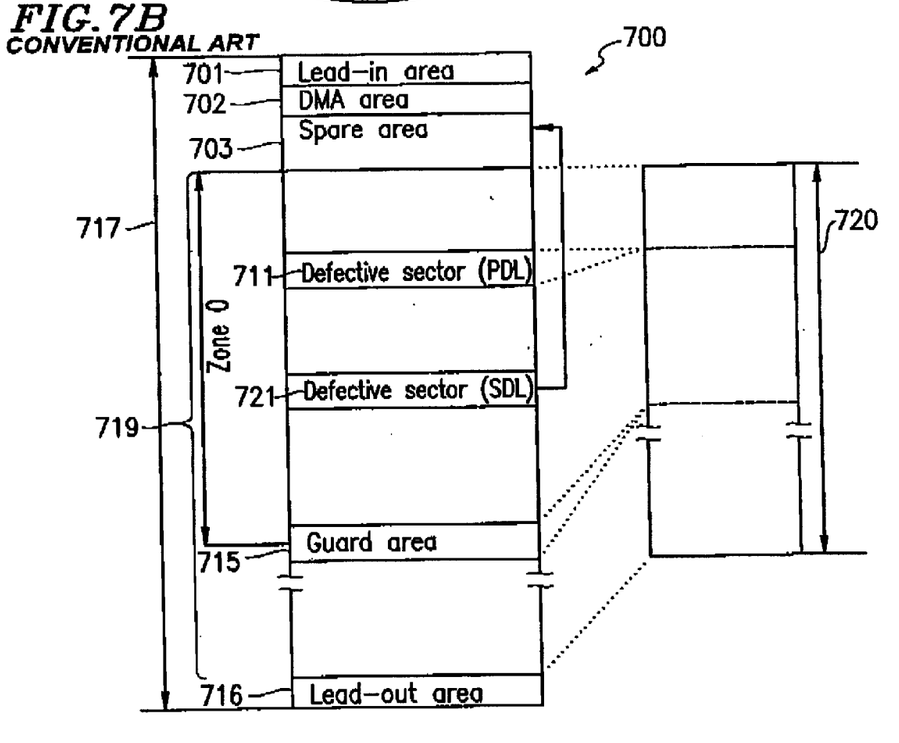

Referring to FIG. 7B, the physical sectors are numbered with physical sector numbers (PSNS) starting from the inner periphery of the disk 700. Physical spaces 717 of the disk 700 are specified by PSNs. On the other hand, the space in which user data can be recorded is defined as a volume space 720 which includes a plurality of sectors which are numbered with logical sector numbers (LSNs). In other words, the volume space 720 is equal to the physical space 717 minus the lead-in area 701, the DMA 702, the spare area 703, a defective sector 711, a guard area 715 provided between two adjacent zones, and the lead-out area 716. The defective sectors 711 are sectors which have been detected as being defective by a certification operation performed during an initialization of the disk 700. The PSNs of the defective sectors 711 are registered and managed in a PDL (primary defect list) (not shown) provided in the DMA 702. A defective sector 721 which have been detected as being defective while recording data onto the disk 700 are replaced with spare sectors from the spare area 703 by a linear replacement method and registered in an SDL (secondary defect list) (not shown) provided in the DMA 702.

Figure 8:
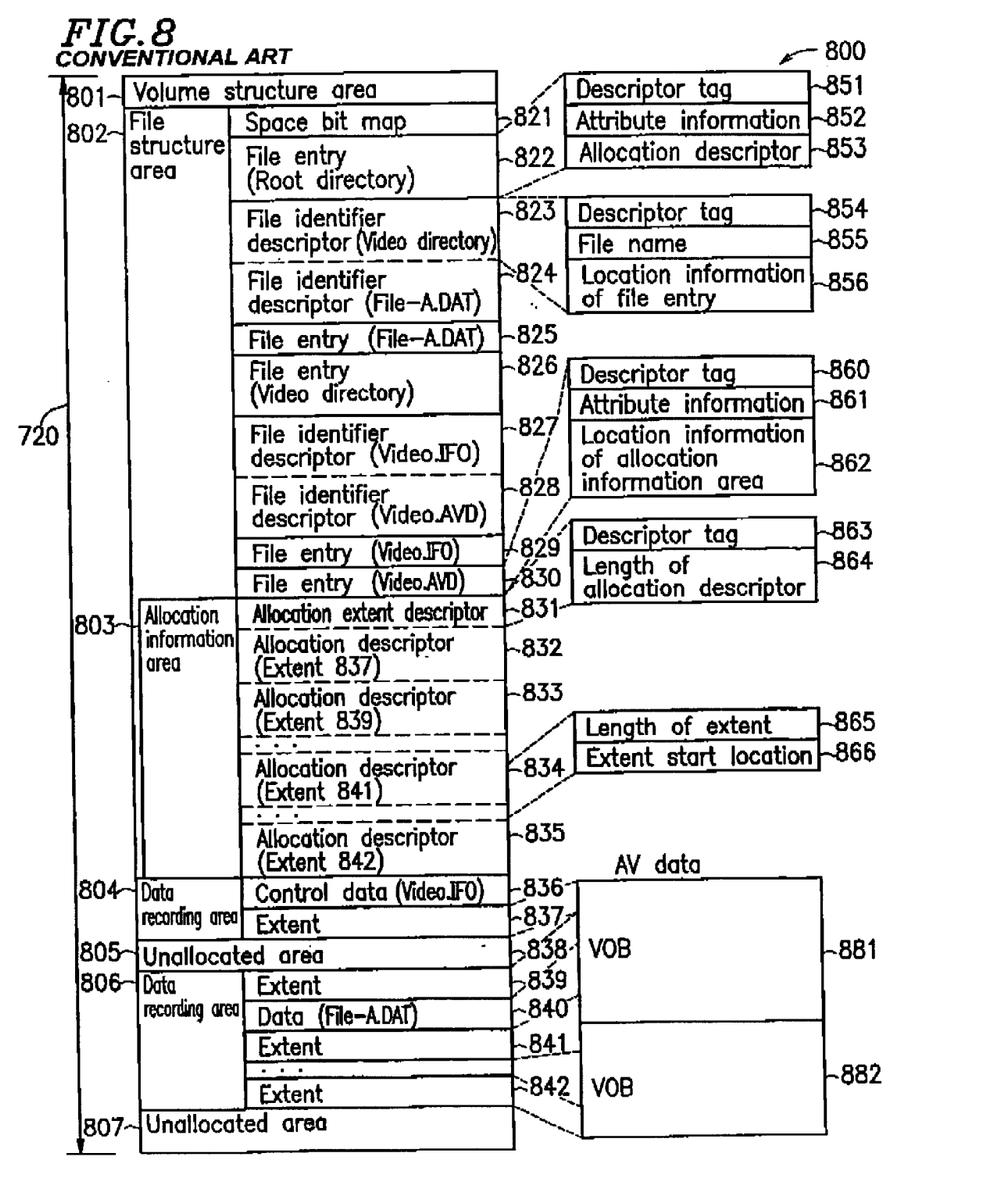
FIG. 8 is a data structure diagram illustrating the area configuration of a conventional information recording medium.

Next, FIG. 8 illustrates an example of a data structure which would result when the various files as mentioned above are recorded on the rewritable disk 700 by using a volume file structure 800 as defined in the ECMA 167 standard. The upper portion and the lower portion of FIG. 8 correspond to the inner periphery and the outer periphery of the disk 700, respectively. Sectors in the volume space 720 are numbered with the logical sector numbers (LSNs) starting from the leading sector of the volume space 720. A volume structure area 801 includes recorded therein information which is used for logically handling the disk 700 as a volume, as well as location information of a space bit map 821, and location information of a file entry 822 of the root directory. While the file set descriptor is defined as a file structure according to the ECMA 167 standard, the file set descriptor is treated herein as a volume structure for the sake of simplicity. It is also assumed herein that files are accessed by using their logical sector numbers for the sake of simplicity, though they are typically accessed by using their logical block numbers.

A file structure area 802 is an area in which a descriptor for defining the file structure is recorded. The file structure area may be recorded in a distributed manner in the volume space 720. The space bit map 821 is a bit map which is used for managing, by blocks of sectors, free areas in the volume space 720 to which a file structure or data can be allocated. The space bit map 821 includes location information of unallocated areas 805 and 807. The file entry 822 includes a descriptor tag 851 indicating that the descriptor is a file entry, attribute information 852 which specifies attribute information of the file used by the file system, e.g., the recording date, and an allocation descriptor 853 for managing the recording location information of a file or a directory. The allocation descriptor 853 has the same data structure as that shown for an allocation descriptor 834. A series of continuous areas in which data is recorded is called an "extent". An extent is specified by a length 865 thereof and a start location 866 thereof. A directory includes one or more file identifier descriptors, and a file identifier descriptor is recorded for every sub-directory or file which is registered in the directory. A file identifier descriptor 823 includes a descriptor tag 854 indicating that the descriptor is a file identifier descriptor, a file name 855 which specifies a file or a directory, and location information 856 of the file entry. Since the root directory 901 (FIG. 9) includes the video directory 902 and the File-A.DAT file 905, the file identifier descriptors 823 and 824 are recorded for the video directory 902 and the File-A.DAT file 905, respectively. Similarly, other directories and files are managed by file identifier descriptors and file entries 825 to 830.

Next, a method for managing the AV data 907 will be described. Typically, AV data has a large data size and is divided into a plurality of portions which are recorded in a plurality of areas on the disk in a distributed manner. For example, when AV data having an average data rate of 5 Mbps (megabits/sec) is recorded for one hour, the size of the recorded data will be 2 GB (gigabytes). Moreover, after repeatedly editing, deleting and adding data, the free areas are typically scattered on the disk. On such a disk whose free areas have been scattered, new AV data is recorded in a distributed manner in a plurality of extents. In FIG. 8, the AV data is recorded in a distributed manner in extents 837, 839, 841 and 842. In such a case, since the volume file structure 800 does not manage the contents of the data to be recorded, a portion of a VOB 881 and a portion of a VOB 882 near the boundary therebetween will be recorded in the same extent (extent 841). The location information of these extents 837, 839, 841 and 842 is recorded in an allocation information area 803 by using allocation descriptors. Since an AV file, as compared to other files, requires a larger number of allocation descriptors to be registered, it may not be possible to register all the allocation descriptors in the file entry 830 which is limited to a size of 1 sector or less. Therefore, location information of the new allocation information area 803 is registered in the location information 862 of the allocation information area in the file entry 830. The allocation information area 803 has an allocation extent descriptor 831 in the leading position therein, followed by allocation descriptors 832, 833, 834 and 835 which are continuously registered immediately after the allocation extent descriptor 831. The allocation extent descriptor 831 has a descriptor tag 863 indicating that the descriptor is an allocation extent descriptor and a length 864 of the allocation descriptor which is registered immediately after the allocation extent descriptor 831. The allocation descriptors 832, 833, 834 and 835 specify the respective extents 837, 839, 841 and 842 of the AV data 907 by the length 865 and the start location 866 thereof.

Next, a method for reproducing the AV data 907 based on the programs 1001 and 1002 of the control data 906 will be described. The programs 1001 and 1002 specify the reproduction start address 1005 and the reproduction end address 1006 of the VOB by the relative address of the AV data 907 with respect to the leading address of the AV data 907. Therefore, in order to find the recording location of the AV data to be actually reproduced, the allocation descriptor in the allocation information area 803 is read out and the logical sector number is calculated therefrom. The reproduction start location is obtained by adding together the lengths 865 of the extents which are registered in the allocation descriptors sequentially starting from the allocation descriptor 832. In particular, when the accumulated length equals the reproduction start location in the AV data, the logical sector number at that time represents the reproduction start location on the disk. The AV data its reproduced by using the allocation descriptor which corresponds to the logical sector number thus obtained. The reproduction end location is calculated in a manner similar to that for the reproduction start location. The reproduction of the AV data ends when the accumulated length of the extents 837, 839, 841 and 842 equals the reproduction end address.

However, with the above-described volume file structure 800, the reproduction of AV data may be discontinuous when the AV data is edited because the data rate information of the recorded areas is not managed. If a table for managing the data rate is created for every recorded area, the size of the table information will be large such that it cannot be managed by a consumer product whose memory size is limited.

SUMMARY OF THE INVENTION

According to one aspect of this invention, there is provided an information recording medium in which data is recorded by using a data structure, the data structure including a file structure area and a data area. The data includes first AV data having a first attribute and second AV data having a second attribute which is different from the first attribute. The data area has continuous areas. At least one of the continuous areas includes a first extent in which at least a portion of the first AV data is recorded and a second extent in which at least a portion of the second AV data is recorded.

In one embodiment of the invention, the file structure area includes an allocation information area in which a first allocation descriptor and a second allocation descriptor are recorded, the first allocation descriptor and the second allocation descriptor respectively representing locations of the first extent and the second extent in which the first AV data and the second AV data are recorded.

In one embodiment of the invention, each of the first AV data and the second AV data, which are recorded/reproduced by blocks of sectors, is recorded as a file by using the file structure.

In one embodiment of the invention, a file entry is recorded in the file structure area, the file entry representing information which specifies the first and second allocation descriptors.

In one embodiment of the invention, the first allocation descriptor includes information representing a length of the first extent and information representing a start location of the first extent. The second allocation descriptor includes information representing a length of the second extent and information representing a start location of the second extent.

In one embodiment of the invention, each of the first AV data and the second AV data has pack header and packet data for every sector.

In one embodiment of the invention, a difference between first time information and second time information recorded in a leading sector and a last sector, respectively, of the extent and a data size of AV data recorded in the extent represent an average data rate which is required for a transfer of the AV data recorded in the extent.

In one embodiment of the invention, the pack header includes time information representing a time relating to a transfer of the packet data.

According to another aspect of this invention, there is provided a data recording method for recording data on an information recording medium in which the data is recorded by using a data structure, the data structure including a file structure area and a data area. The data includes first AV data having a first attribute and second AV data having a second attribute which is different from the first attribute. The data area has continuous areas. At least one of the continuous areas includes a first extent in which at least a portion of the first AV data is recorded and a second extent in which at least a portion of the second AV data is recorded. The file structure area includes an allocation information area in which a first allocation descriptor and a second allocation descriptor are recorded, the first allocation descriptor and the second allocation descriptor respectively representing locations of the first extent and the second extent in which the first AV data and the second AV data are recorded. The data recording method includes: a first step of recording the first AV data and the second AV data in the first extent and the second extent, respectively: a second step of creating the first allocation descriptor and the second allocation descriptor; and a third step of recording the first allocation descriptor and the second allocation descriptor in the allocation information area.

According to still another aspect of this invention, there is provided a data editing method using an information recording medium in which data is recorded. The data includes AV data which is recorded/reproduced by blocks of sectors and includes a plurality of AV data portions, the AV data portions each corresponding to one of the sectors and having time information. The data area includes first and second continuous areas, each of the first area and the second area including a plurality of the sectors for recording a plurality of the AV data portions. The data editing method includes: a first stop of reading out a leading sector and a last sector of each of the continuous areas so as to obtain first time information corresponding to the leading sector and second time information corresponding to the last sector; a second step of reading out an edition point sector corresponding to a predetermined edition point so as to obtain third time information corresponding to the edition point sector; and a third step of determining whether or not the AV data is continuously reproducible based on a size of the first and second continuous areas, the first time information, the second time information, and the third time information.

In one embodiment of the invention, the data editing method uses a data structure, the data structure including a file structure area and a data area. The file structure area includes an allocation information area in which a first allocation descriptor and a second allocation descriptor are recorded, the first allocation descriptor and the second allocation descriptor respectively representing locations of a first extent and a second extent, the first extent and the second extent corresponding respective to the first and second continuous areas in which the AV data is recorded. The third step determines whether or not the AV data is continuously reproducible based on the first allocation descriptor, the second allocation descriptor, the first time information, the second time information, and the third time information, the first and second allocation descriptors representing location information of the first and second extents, respectively.

In one embodiment of the invention, the data area includes an area in which information representing locations of the first and second continuous areas is recorded as a portion of control data. The third step comprises the step of obtaining the information representing the locations of the first and second continuous areas based on the control data.

In one embodiment of the invention, the file structure area includes an area in which a file entry is recorded, the file entry representing the locations of the first extent and the second extent. The third step comprises a step of obtaining information representing the locations of the first extent and the second extent based on the file entry.

In one embodiment of the invention, the data area includes an area in which control data is recorded, the control data including information representing the locations of the first extent and the second extent. The third step comprises a step of obtaining information representing the locations of the first extent and the second extent based on the control data.

According to still another aspect of this invention, there is provided an information recording system apparatus for recording data on an information recording medium in which data is recorded by using a data structure, the data structure including a file structure area and a data area. The data includes first AV data having a first attribute and second AV data having a second attribute which is different from the first attribute. The data area has continuous areas. At least one of the continuous areas includes a first extent in which at least a portion of the first AV data is recorded and a second extent in which at least a portion of the second AV data is recorded. The file structure area includes an allocation information area in which a first allocation descriptor and a second allocation descriptor are recorded, the first allocation descriptor and the second allocation descriptor respectively representing locations of the first extent and the second extent in which the first AV data and the second AV data are recorded, the information recording system apparatus comprising a data recording section for recording the first AV data and the second AV data in the data area. The information recording system apparatus includes: a data recording section for recording the first AV data and the second AV data in the data area; an AV file structure processing section for creating a file entry which is used for managing the first AV data and the second AV data and recording the file entry in the file structure area; and an AV allocation structure processing section for creating the first allocation descriptor and the second allocation descriptor and recording the first allocation descriptor and the second allocation descriptor in the allocation information area.

According to still another aspect of this invention, there is provided an information recording system apparatus for editing data by using an information recording medium in which the data is recorded by using a data structure, the data structure including a file structure area and a data area. The data includes AV data which is recorded/reproduced by blocks of sectors and includes a plurality of AV data portions, the AV data portions each corresponding to one of the sectors and having time information. The data area includes a first extent and a second extent, each of the first extent and the second extent including a plurality of the sectors for recording a plurality of the AV data portions. The file structure area includes an allocation information area in which a first allocation descriptor and a second allocation descriptor are recorded, the first allocation descriptor and the second allocation descriptor respectively representing locations of the first extent and the second extent. The information recording system apparatus includes: an AV file structure processing section for reading out the first allocation descriptor and the second allocation descriptor from the allocation information area so as to obtain location information of the first extent and the second extent; and an AV allocation structure processing section for reading out a leading sector and a last sector of each extent so as to obtain first time information corresponding to the leading sector and second time information corresponding to the last sector. The AV allocation structure processing section reads out an edition point sector corresponding to a predetermined edition point so as to obtain third time information corresponding to the edition point sector. The AV allocation structure processing section determines whether or not the AV data is continuously reproducible based on the first allocation descriptor, the second allocation descriptor, the first time information, the second time information, and the third time information.

According to still another aspect of this invention, there is provided an information recording medium in which data is recorded by using a data structure, the data structure including a file structure area and a data area, wherein the data area has physically continuous areas, AV data being recorded in at least some of the physically continuous areas.

In one embodiment of the invention, the file structure area includes an allocation information area in which an allocation descriptor indicating a location of an extent is recorded, the extent being one of the physically continuous areas in which the AV data is recorded.

According to still another aspect of this invention, there is provided a data recording method for recording data on an information recording medium in which the data is recorded by using a data structure, the data structure including a file structure area and a data area, wherein the data area has physically continuous areas. The data recording method includes the steps of: recording AV data in the physically continuous areas; creating an allocation descriptor indicating a location of an extent, the extent being one of the physically continuous areas in which the AV data is recorded; and recording the allocation descriptor in the allocation information area.

According to still another aspect of this invention, there is provided an information recording system apparatus for recording data on an information recording medium in which data is recorded by using a data structure, the data structure including a file structure area and a data area, wherein the data area has physically continuous areas. The information recording system apparatus includes: a section for recording AV data in the physically continuous areas; a section for creating an allocation descriptor indicating a location of an extent, the extent being one of the physically continuous areas in which the AV data is recorded; and a section for recording the allocation descriptor in the allocation information area.

Thus, the invention described herein makes possible the advantages of providing an information recording medium, an information recording/reproduction method, and an information recording/reproduction system apparatus, which is capable of managing the data rate for every area in which AV data is recorded and with which it is possible to efficiently edit the AV data while ensuring continuous reproduction of the AV data.

These and other advantages of the present invention will become apparent to those skilled in the art upon reading and understanding the following detailed description with reference to the accompanying figures.

DESCRIPTION OF THE PREFERRED EMBODIMENTS

Embodiments of the present invention will now be described with reference to the figures.

Embodiment 1

One embodiment of the present invention will now be described. This embodiment is directed to an information recording/reproduction system apparatus for recording/reproducing files to/from an information recording medium such as a DVD-RAM disk in which data is recorded by blocks of sectors, wherein the files are managed by using the file structure as defined in the ECMA 167 standard. The data structure of such an information recording medium will also be discussed below.

Figure 1:
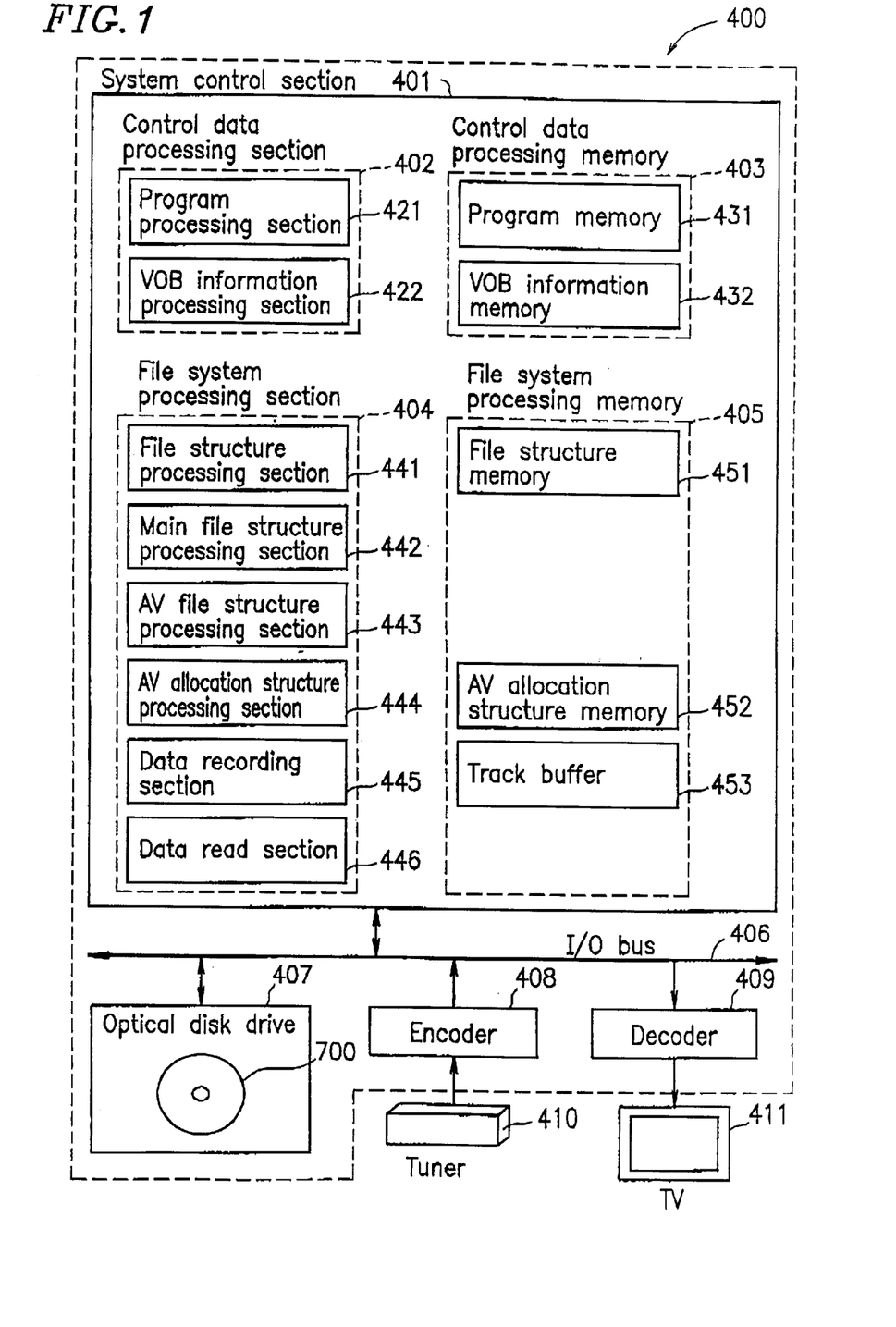
FIG. 1 is a block diagram illustrating a configuration of an information recording/reproduction system apparatus according to one embodiment of the present invention.

FIG. 1 is a block diagram illustrating the configuration of an information recording/reproduction system apparatus 400 according to the present embodiment. The information recording/reproduction system apparatus 400 includes a system control section 401, an optical disk drive unit 407, an encoder 408 and a decoder 409 which are connected together via an I/O bus 406. An AV signal is input from a tuner 410 and compressed by the encoder 408 into MPEG program stream data (hereinafter, referred to as "AV data"). After being subjected to a predetermined process in the system control section 401, the compressed data is recorded onto the disk 700 which has been loaded into the optical disk drive unit 407. In an AV data reproduction, data of interest is read out from the disk 700 in the optical disk drive unit 407 under the control of the system control section 401. The read AV data is converted by the decoder 409 into an AV signal, and the decoded images and sounds are reproduced by a TV 411. The system control section 401 is implemented by a microprocessor including a control program and an arithmetic memory. The system control section 401 further includes a control data processing section 402 for processing the control data 906 (FIGS. 9 and 10) which is used for controlling the reproduction of the AV data, a control data memory 403 for storing the control information, a file system processing section 404 for processing file structure information, and a file system memory 405 for storing the processed information. The memories 403 and 405 may be provided by dividing one memory circuit into two sections. The control data 906 has a data structure as described earlier with reference to FIG. 10. The control data processing section 402 includes a program processing section 421 for processing a program and a VOB information processing section 422 for processing information of VOBs. The control data memory, 403 includes a program memory 431 and a VOB information memory 432. The file system processing section 404 includes a file structure processing sections 441 and 442, an AV file structure processing section 443, an AV allocation structure processing section 444, a data recording section 445, and a data read section 446. In order to store information processed through these sections, the file system memory 405 includes a file structure memory 451, an AV allocation structure memory 452, and a track buffer 453.

A recording operation using the information recording/reproduction system apparatus 400 for recording the AV data 907 and the associated control data 906 onto an information recording medium in which only the File-A.DAT file has been recorded under the root directory 901 in the directory structure diagram illustrated in FIG. 9 will be described below.

Figure 2:
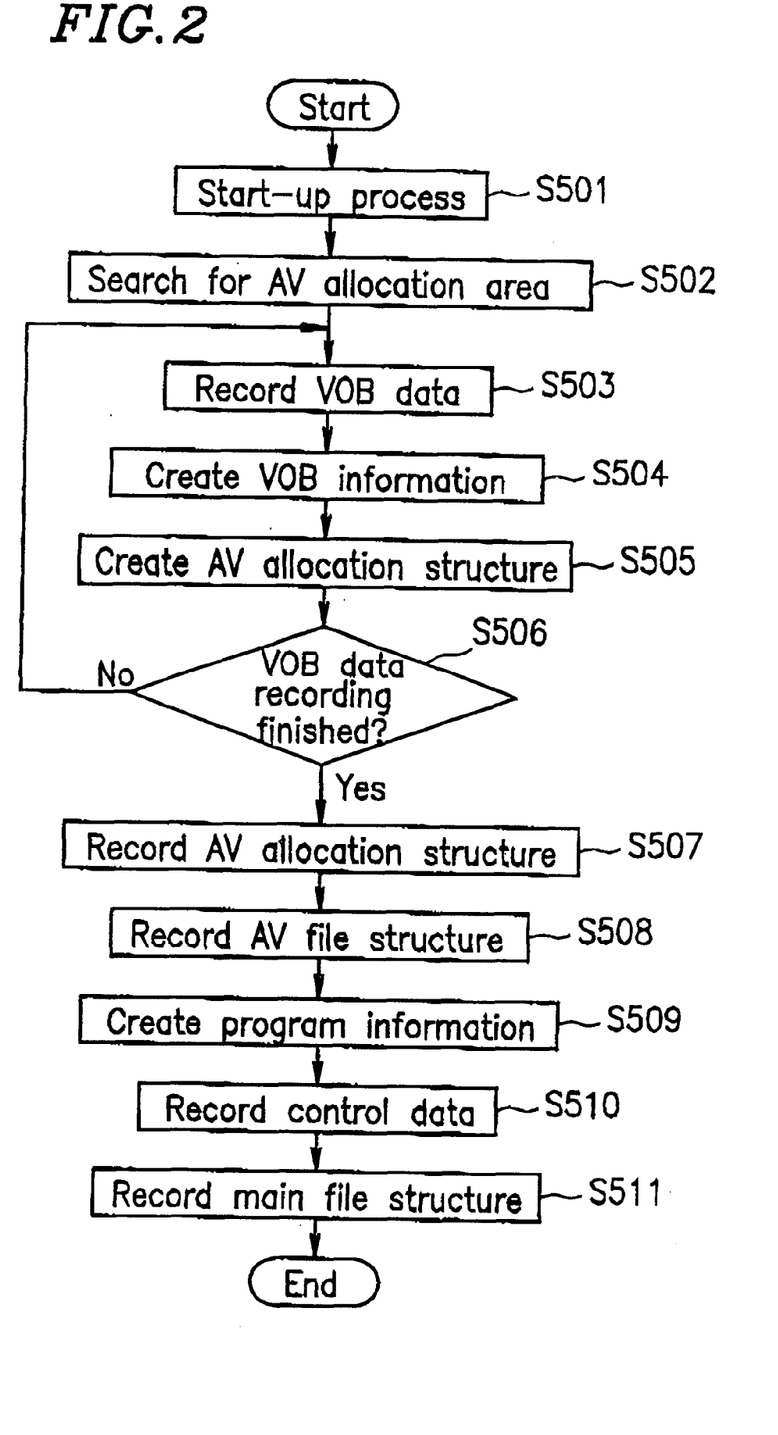
FIG. 2 is a flow chart illustrating a recording operation performed by using an information recording/reproduction system apparatus according to one embodiment of the present invention.
Figure 3:
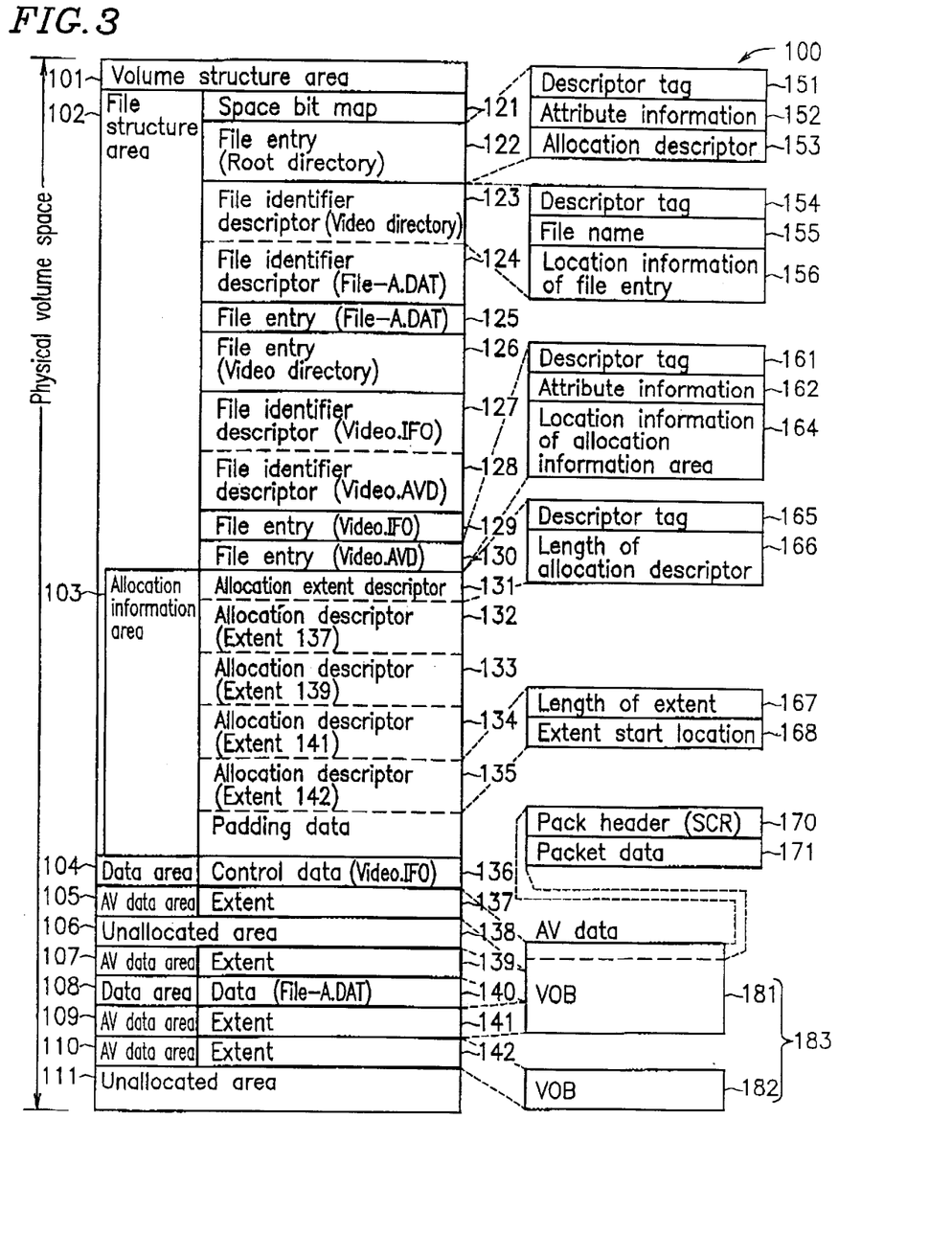
FIG. 3 is a data structure diagram illustrating the area configuration according to one embodiment of the present invention.
Figure 9:
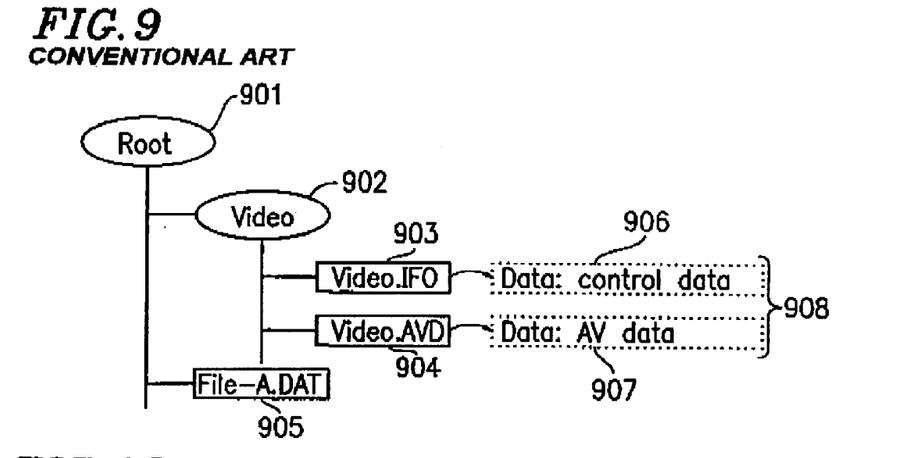
FIG. 9 is a diagram illustrating a conventional file directory structure.
Figure 10:
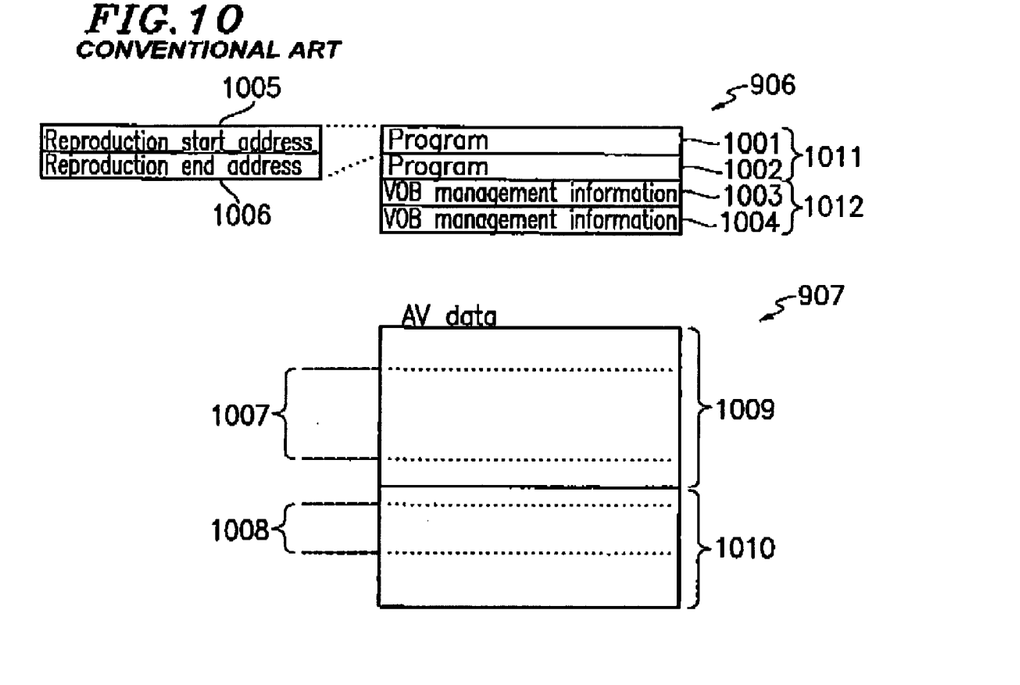
FIG. 10 in a diagram illustrating conventional data structures for control data and AV data.

FIG. 3 illustrates a data structure 100 after the video directory 902, the Video.IFO file 903 and the Video.AVD file 904 have been recorded under the root directory 901 (as shown in FIG. 9) in a manner as shown in the recording operation flow chart of FIG. 2. FIG. 3 illustrates a physical space in order to clearly show physically continuous areas for reproducing AV data.

When the disk 700 is inserted into the optical disk drive unit 407 and the user instructs system control section 401 to record AV data, the file system processing section 404 is activated. First, an instruction is made to read out a volume structure area 101 from the disk 700 to the optical disk drive unit 407 by using the data read section 446, and the read information is stored in the file structure memory 451. The file structure processing section 441 analyzes the volume structure and successively reads out information in a file structure area 102 to the file structure memory 451 starting from the information of a space bit map 121. At this time, the file structure processing section 441 inquires of the optical disk drive 407 location information of the defective sectors 711, 721 registered in PDLs or SDLs and location information of the guard area 715 between two adjacent zones as non-data area information which cannot be seen from the volume space of the disk inserted in the optical disk drive 407. The non-data area information obtained from the optical disk drive 407 is read out to the program memory 431 ("start-up" step: S501 in FIG. 2).

In order to continuously reproduce AV data 183, the AV allocation structure processing section 444 searches for a free area having a predetermined size, e.g., equal to or greater than 5 MB, based on the information of the space bit map 121 and registers AV data areas 105, 107, 109 and 110 in the AV allocation structure memory 452 as AV recordable areas. At this time, the AV recordable area is divided along this boundary if the AV recordable area includes any non-data areas which are physically managed even if the AV recordable area has continuous logical sector numbers ("search for AV allocation area" step: S502 in FIG. 2).

Although not shown, when the user instructs the system control section 401 to start recording AV data, the AV data is transmitted from the tuner 410 via the encoder 408 and recorded in the previously found AV recordable areas (the AV data areas 105, 107, 109 and 110). In particular, a VOB 181 is recorded in extents 137, 139 and 141. The VOB 181 includes a program stream, and therefore has a pack header 170 and packet data 171 for every logical sector. In the pack header 170, a SCR (system clock reference) is recorded as information representing the amount of time required for a transfer of the packet data 171 to the decoder 409. During reproduction, each sector is transferred to the decoder 409 within the amount of time indicated by the SCR so as to ensure continuous decoding of AV data ("record VOB data" step: S503 in FIG. 1).

The VOB information processing section 422 stores in the VOB information memory 432 parameters for the compression of AV data, the data size of each GOP as defined in MPEG, and the reproduction time information, which have been output from the encoder 408, and creates the information of the control data of the VOB 181 ("create VOB information" step: S504 in FIG. 1).

The AV allocation structure processing section 444 creates an allocation extent descriptor 131 and allocation descriptors 132, 133 and 134 corresponding to the extents 137, 139 and 141, respectively ("create AV allocation structure" step: S505 in FIG. 1).

The VOB information processing section 422 determines whether it is necessary to record another VOB (step: S506 in FIG. 1). If the VOB recording has been finished ("Yes" in S506), the process proceeds to step S507. If it is necessary to record another VOB ("No" in S506), the steps from S503 to S505 are performed. For example, when a live baseball program is to be output from the tuner 410 following a news program, the news program and the live baseball program are recorded as the VOB 181 and the VOB 182, respectively (step of determining whether VOB data recording has been finished: S506).

The VOB 182 is recorded as an extent 142 and an allocation descriptor 135 of the VOB 182 is created in a manner similar to that for the extents 137, 139 and 141. The extents 141 and 142 are physically a single continuous area. However, this single continuous area is divided into the extents 141 and 142 along the boundary between the VOB 181 and the VOB 182 (S503 to S505).

The VOB information processing section 422 confirms the recording of the VOB 182, after which the file system processing section 404 is activated. The AV allocation structure processing section 444 records the information of the AV allocation structure memory 452 in an AV allocation information area 103 ("record AV allocation structure" step: S507 in FIG. 2).

The AV file structure processing section 443 creates a file entry of an AV file in the file structure memory 451 so as to manage the AV data, and records the file entry in a file entry area 130 ("record AV file structure" step: S508 in FIG. 2).

The program processing section 421 creates, and stores in the program memory 431, a program in which the user specifies a portion or portions of the recorded AV data to be reproduced or the order of reproduction for the portions to be reproduced ("create program information" step: S509 in FIG. 2).

The control data processing section 402 records the information of the program memory 431 and the VOB information memory 432 as control data 136 in a data area 104 ("record control data" step: S510 in FIG. 2).

In order to manage the control data 136 as the Video.IFO file data, the file structure processing section 442 creates a file entry on the file structure memory 451, and records a file entry 129 in the file structure area 102. Moreover, a directory for managing an AV file and the associated control file is recorded in the file structure area 102 as a sub-directory under the root directory, and a file identifier descriptor 123, a file entry 126, and file identifier descriptors 127 and 128 are recorded ("record main file structure" step: S511 in FIG. 2).

The AV allocation information area 103 may be recorded in the file entry area 130 if the file entry thereof is of a size less than or equal to 1 sector.

Next, a method for continuously reproducing AV data will be described with reference to FIGS. 1 and 4. Referring to FIG. 1, the data (an MPEG signal) read out from the disk 700 in the optical disk drive unit 407 is once stored in the track buffer 453. Then, the MPEG signal is decompressed by the decoder 409 into a video signal which is in turn displayed as an image on the TV 411.

Figure 4:
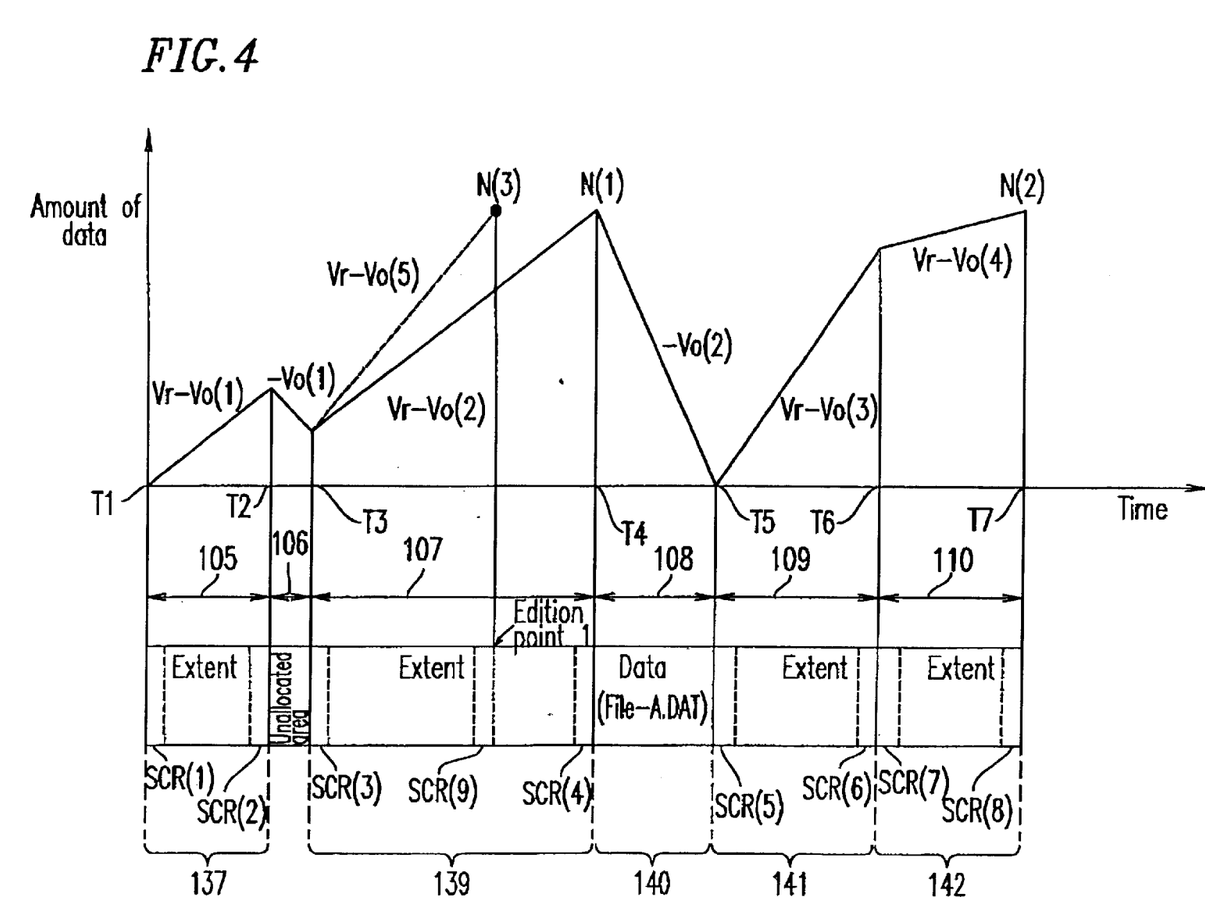
FIG. 4 illustrates a simulation result illustrating changes in the state of a track buffer during the reproduction of the AV data recorded on the information recording medium of the present invention.

Referring to FIG. 4, the AV data is read out from continuous areas of the disk 700 at a constant data rate Vr (data reading rate of the optical disk drive 407), and stored in the track buffer 453. The AV data stored in the track buffer 453 is transferred to the decoder 409 at a AV data transfer rate Vo. Since the AV data transfer rate Vo is less than the data rate Vr, the AV data is stored in the track buffer 453 at a rate of Vr-Vo. When the optical disk drive 407 accesses an area other than the AV data areas 105, 107, 109 and 110, the AV data transfer into the track buffer 453 discontinues. Therefore, the amount of the AV data in the track buffer 453 decreases at a rate of Vo.

FIG. 4 illustrates changes in the amount of data in the track buffer 453 during the reproduction of the AV data from the extents 137 to 142 illustrated in FIG. 3. The AV data transfer rate for each of the extents 137, 139, 141 and 142 can be obtained based on: the difference between the SCR recorded in the leading sector of each of the extents and the SCR recorded in the last sector of each of the extents; and the data size of the AV data recorded in each of the extents.

Since the contents of the AV data recorded in the extent 141 and the contents of the AV data recorded in the extent 142 are different from each other, the SCR recorded in the last sector of the extent 141 and the SCR recorded in the leading sector of the extent 142 are not related with each other.

The AV data transfer rate for the extent 137 is obtained based on SCR(1) and SCR(2) which are recorded in the leading sector and the last sector, respectively, of the extent 137. The AV data transfer rate for the extent 139 is obtained based on SCR(3) and SCR(4) which are recorded in the leading sector and the last sector, respectively, of the extent 139. The AV data transfer rate for the extent 141 is obtained based on SCR(5) and SCR(6) which are recorded in the leading sector and the last sector, respectively, of the extent 141. The AV data transfer rate for the extent 142 is obtained based on SCR(7) and SCR(8) which are recorded in the leading sector and the last sector, respectively, of the extent 142.

The AV data transfer rates for the extents 137, 139, 141 and 142 are hereinafter denoted as Vo(1), Vo(2), Vo(3) and Vo(4), respectively.

In a time period T1 to T2 during which the AV data is read out from the extent 137, the AV data is stored in the track buffer 453 at a rate of Vr-Vo(1). Then, in a time period T2 to T3 during which the drive 407 accesses an unallocated area 106, the operation of reading out the AV data from the extents discontinues. Therefore, the AV data in the track buffer 453 is consumed at a rate of Vo(1). Similarly, in a time period T3 to T4 during which the AV data is read out from the extent 139, the AV data is stored in the track buffer 453 at a rate of Vr-Vo(2). In a time period T4 to T5 during which the drive 407 accesses a data area 108, the AV data in the track buffer 453 is consumed at a rate of Vo(2). In time periods T5 to T6 and T6 to T7 during which the AV data is read out from the extents 141 and 142, respectively, the AV data is stored in the track buffer 453 at a rate of Vr-Vo(3) and at a rate of Vr-Vo(4), respectively. Thus, it is possible to ensure the continuous reproduction of AV data as long as the amount of data in the track buffer 453 does not decrease to zero.

Next, specific criteria which are used for determining whether AV data recorded in two areas can be continuously reproduced will be discussed.

The minimum physically continuous extent length N_ecc required for continuous reproduction of AV data can be expressed as follows:

$$N\_ecc >= Vo \times Tj / ((16 \times 8 \times 2048) \times (1 - Vo/Vr)) \quad \text{(Expression 1)}$$

where the minimum extent length N_ecc is the number of ECC (error correction code) blocks in the extent (assuming that a length of one ECC block equals 16 sectors), Vo is the average data rate (in Mbps) of the recorded AV data, Tj is the access time (in secs) from the inner periphery to the outer periphery of the disk 700, and Vr is the constant data reading rate (in Mbps) at which a reproduction apparatus reads out data from a series of continuous areas.

The access time of an optical disk drive is substantially constant for any distance to the data being accessed which is equal to or greater than a certain distance. Therefore, it is effective to employ the access time from the inner periphery to the outer periphery of the disk 700 as a common access time.

Based on actually recorded data, the average data rate Vo can be expressed as follows:

$$Vo=(N\_pack-1)\times 2048\times 8/(27000000/(SCR(i)-SCR(i-1))) \quad \text{(Expression 2)}$$

where N_pack is the number of logical sectors in an extent, SCR(i) is an SCR value recorded in the last logical sector of the extent (obtained by counting the number of 27 MHz clock signals), and SCR(i−1) is an SCR value recorded in the first logical sector in the extent.

Where some small-sized access areas (unallocated areas, data areas) having no AV data therein are included between extents, the minimum extent length can be expressed as follows:

$$Nt\_ecc \geq = dN\_ecc + Vo \times (Tj+Ts)/((16\times 8\times 2048)\times (1-Vo/Vr)) \quad \text{(Expression 3)}$$

where the minimum extent length Nt_ecc is the total length of the access areas (unallocated areas, data areas) (in units of the number of ECC blocks) included between extents, dN_ecc is the total length of each access area (in units of the number of ECC blocks), and Ts is the total amount of time for which each access area is accessed. This access time is defined as Nt_ecc×16×8×2048/Vr.

Using Expression 3, it is possible to determine, for example, whether the amount of data in the track buffer 453 would decrease to zero when reading out AV data from the extents 137 and 139 where the unallocated area 106 having no AV data recorded thereon exists between the extents 137 and 139. The average data rate Vo can be calculated as follows:

$$Vo=(N\_pack-2)\times 2048\times 8/(27000000/(SCR(2)-SCR(1)+SCR(4)-SCR(3))) \quad \text{(Expression 4)}$$

where N_pack is the total number of sectors in the extents 137 and 139.

Generally, the average data rate Vo for a number k of extents can be calculated as follows:

$$Vo=(N\_pack-k)\times 2048\times 8/(27000000/\Sigma(SCR(i)-SCR(i-1))) \quad \text{(Expression 5)}$$

where Σ(SCR(i)−SCR(i−1)) is a value obtained by adding together, for all the extents, the difference between the SCR value of the first sector of each extent and the SCR value of the last sector of the extent.

Figure 5:
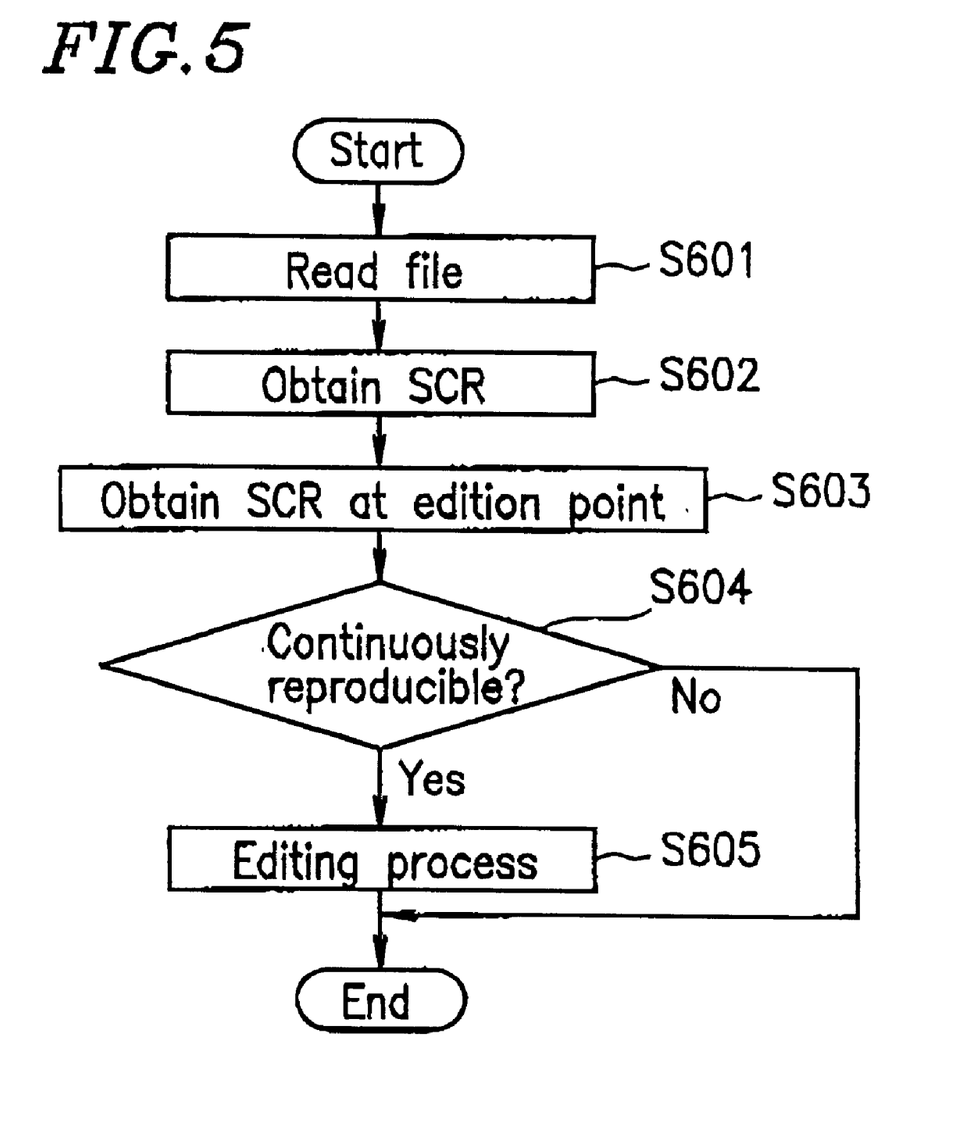
FIG. 5 is a flow chart illustrating an editing operation performed by using an information recording/reproduction system apparatus according to one embodiment of the present invention.

Next, referring to the flow chart of FIG. 5, an operation of editing the AV data as illustrated in FIG. 4 by using the information recording/reproduction system apparatus 400 of FIG. 1 will be described, When the user instructs the information recording/reproduction system apparatus 400 to edit the AV data, the file system processing section 404 is first activated to instruct the data read section 446 to read out the volume structure area 101 from the disk 700 to the optical disk drive 407. The read information is stored in the file structure memory 451. The file structure processing section 441 analyzes the volume structure and reads out the file structure area 102 to the file structure memory 451.

Then, the file structure processing section 441 searches for the video directory 902, the Video.IFO file 903 and the Video.AVD file 904 under the root directory 901. Then, the file structure processing section 442 reads out the file entries 129 and 130 to the file structure memory 451, analyzes the location information of the control data 136, and reads out the control data 136 to the program memory 431. Then, the AV file structure processing section 443 reads out the AV allocation information area 103 to the file structure memory 451 and obtains the location information of each extent ("read file" step: S601 in FIG. 5).

The AV allocation structure processing section 444 instructs the optical disk drive 407 to read out the SCR recorded in the pack header 170 of each extent. The information is read out to the AV allocation structure memory 452, and the SCR values are stored in the AV allocation structure memory 452 ("obtain SCR" step: S602 in FIG. 5).

Then, if the user specifies an edition point 1 (FIG. 4), the AV allocation structure processing section 444 instructs the optical disk drive 407 to read out the sector information corresponding to edition point 1. The read information is read out to the AV allocation structure memory 452, and the SCR value is stored as SCR(9) in the AV allocation structure memory 452 ("obtain SCR at edition point" step: S603 in FIG. 5).

Then, the AV allocation structure processing section 444 determines Nt_ecc according to Expression 3. Based on Expression 5 Vo(5) can be calculated as follows:

$$Vo=(N\_pack-2)\times 2048\times 8/(27000000/(SCR(2)-SCR(1)+SCR(9)-SCR(3))) \quad \text{(Expression 6)}$$

If Nt_ecc satisfies the condition of Expression 3, the extents 139 and 141 can be continuously reproduced even if the remaining portion of the extent 139 following edition point 1 is cleared (step of determining whether the AV data is continuously reproducible: S604 in FIG. 5).

If the AV data is continuously reproducible ("Yes" in S604), the AV allocation structure processing section 444 updates the allocation descriptor 133 of the extent 139 and record the updated allocation descriptor 133 in the AV allocation information area 103.

Then, the file structure processing section 441 instructs the optical disk drive 407 to update the space bit map on the file structure memory 451 and to update the space bit map 121 on the disk 700 so that other data can be recorded in the cleared area of the extent 139 following edition point 1 ("editing process" step: S605 in FIG. 5).

Figure 6:
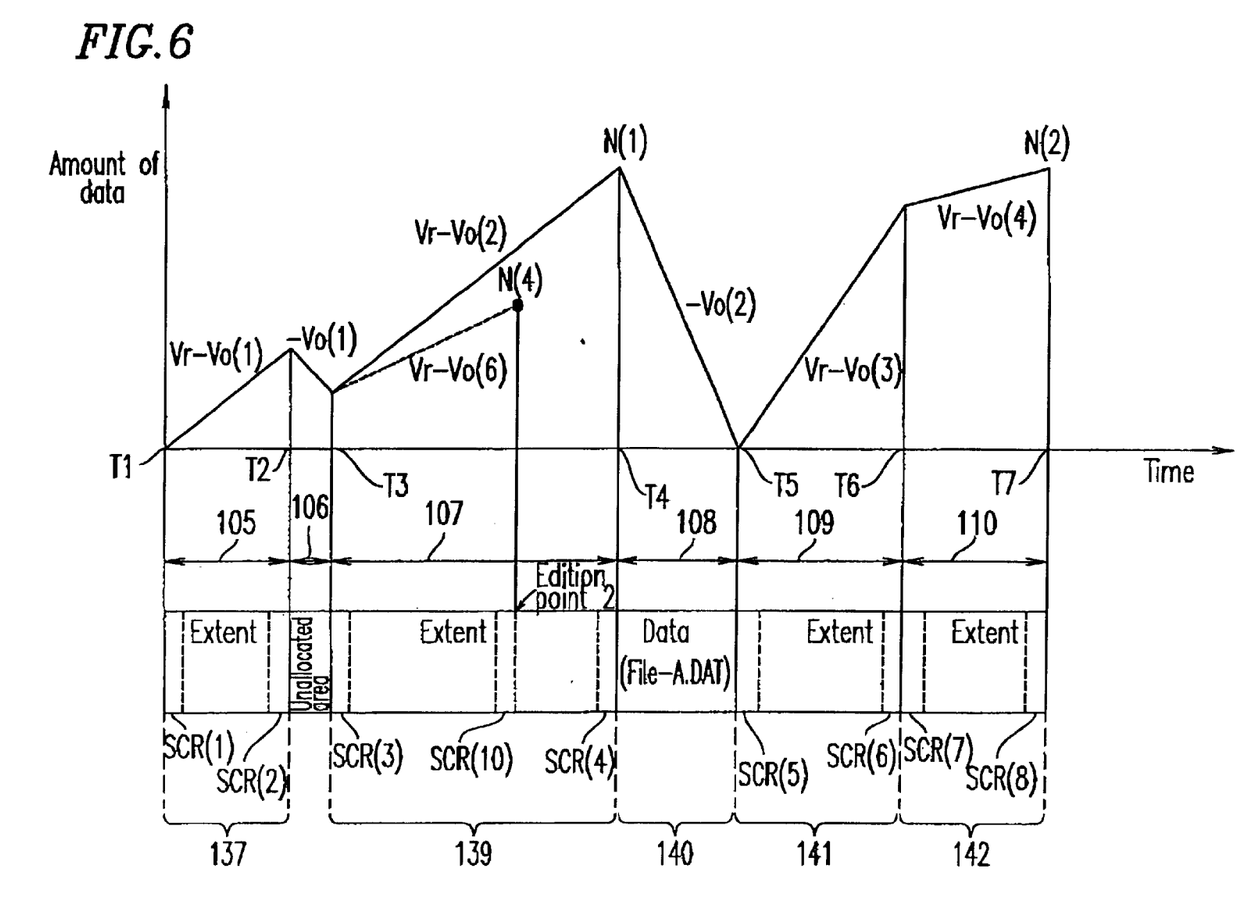
FIG. 6 illustrates another simulation result illustrating changes in the state of a track buffer during the reproduction of the AV data recorded on the information recording medium according to one embodiment of the present invention.

If the user specifies edition point 2 as shown in FIG. 6, Expression 3 is calculated with the SCR (10) for edition point 2, and it is determined in step S604 that the condition of Expression 3 is not satisfied ("No" in S604). Therefore, if the remaining portion of the extent 139 following edition point 2 is cleared, the amount of data in the track buffer 453 would decrease to zero. Thus, it would not be possible to continuously reproduce the AV data. Therefore, in such a case, the process is terminated without performing the editing process which if performed would delete the data from the remaining portion of the extent 139.

As described above, according to the present embodiment, a plurality of extents are managed by a series of continuous SCRs, whereby the average data rate of the data recorded on the disk 700 can be correctly calculated. Therefore, whether continuous reproduction would be ensured after an edition can be correctly determined by reading out the first sector and the last sector of each extent without having to reproduce all the data.

As described above, by recording AV data having continuous parameters in each physically continuous area, it is possible to accurately calculate the average data rate of the recorded data for each area and thus to accurately determine the track buffer in a reproduction operation.

A plurality of different types of AV data may be recorded as a plurality of files in the video directory 902. For example, different sets of AV data may be recorded based on the recording times and/or dates or a still image and a motion picture may be recorded separately as different VOBs. Alternatively, different sets of AV data may be recorded based on the titles thereof.

In the example described above, continuous areas in each of which data having the same attribute is recorded are managed as the extents 141 and 142. However, the information of the data having the same attribute may be recorded in attribute information 162 of the file entry 130 as attribute information of an AV file, or the information of the data having the same attribute may be recorded as a named stream by using an extension file entry.

In the example shown above, continuous areas in each of which data having the same attribute is recorded are managed as the extents 141 and 142, and the location information of the extent 141 and the location information of the extent 142 are managed by the allocation descriptors 134 and 135, respectively. Alternatively, the information relating to the locations of the extents 141 and 142 may be recorded in the Video.IFO file as a portion of the control data 136. For example, the length of each of the extents 141 and 142 may be recorded in a tabular form for each of the extents as a portion of the control data 136. In such a case, an area which is managed by the allocation descriptors 134 and 135 does not have to be an area in which data having the same attribute is recorded. Thus, it is possible to simplify the file structure. When determining whether the AV data can be continuously reproduced around an edition point, the location information of each of the extents 141 and 142 can be known based on the allocation descriptors 134 and 135 and the lengths of the extents 141 and 142 which have been recorded as the control data 136. Therefore, it is possible to easily determine whether the AV data can be continuously reproduced around the edition point.

In the information recording medium of the present invention, areas in which the AV data is recorded are managed as extents in the AV file structure. Therefore, it is possible to ensure the continuous reproduction of the recorded AV data. It is not necessary to read out all the sectors in which the AV data is recorded so as to examine whether the AV data can be continuously reproduced. It is only necessary to read out the leading sector and the last sector of each extent. Therefore, edition of AV data can be made efficiently.

Moreover, it is possible to ensure the continuous reproduction of the recorded AV data by managing the area in which AV data is recorded as divided extents taking into consideration a physical area in the AV file structure in which user data cannot be recorded and the continuity of the AV data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data editing method using an information recording medium in which data is recorded, wherein:
the data includes AV data which is recorded/reproduced by blocks of sectors and includes a plurality of AV data portions, the AV data portions each corresponding to one of the sectors and having time information; and
the data area includes first and second continuous areas, each of the first area and the second area including a plurality of the sectors for recording a plurality of the AV data portions, the data editing method comprising:
a first step of reading out a leading sector and a last sector of each of the continuous areas so as to obtain first time information corresponding to the leading sector and second time information corresponding to the last sector;
a second step of reading out an edition point sector corresponding to a predetermined edition point so as to obtain third time information corresponding to the edition point sector; and
a third step of determining whether or not the AV data is continuously reproducible based on a size of the first and second continuous areas, the first time information, the second time information, and the third time information.

2. A data editing method according to claim 1, wherein:
the data editing method uses a data structure, the data structure including a file structure area and a data area;
the file structure area includes an allocation information area in which a first allocation descriptor and a second allocation descriptor are recorded, the first allocation descriptor and the second allocation descriptor respectively representing locations of a first extent and a second extent, the first extent and the second extent corresponding respective to the first and second continuous areas in which the AV data is recorded; and
the third step determines whether or not the AV data is continuously reproducible based on the first allocation descriptor, the second allocation descriptor, the first time information, the second time information, and the third time information, the first and second allocation descriptors representing location information of the first and second extents, respectively.

3. A data editing method according to claim 1, wherein:
the data area includes an area in which information representing locations of the first and second continuous areas is recorded as a portion of control data; and
the third step comprises the step of obtaining the information representing the locations of the first and second continuous areas based on the control data.

4. A data editing method according to claim 1, wherein:
the file structure area includes an area in which a file entry is recorded, the file entry representing the locations of the first extent and the second extent; and
the third step comprises a step of obtaining information representing the locations of the first extent and the second extent based on the file entry.

5. A data editing method according to claim 1, wherein:
the data area includes an area in which control data is recorded, the control data including information representing the locations of the first extent and the second extent; and
the third step comprises a step of obtaining information representing the locations of the first extent and the second extent based on the control data.

6. An information recording system apparatus for editing data by using an information recording medium in which the data is recorded by using a data structure, the data structure including a file structure area and a data area, wherein:
the data includes AV data which is recorded/reproduced by blocks of sectors and includes a plurality of AV data portions, the AV data portions each corresponding to one of the sectors and having time information;
the data area includes a first extent and a second extent, each of the first extent and the second extent including a plurality of the sectors for recording a plurality of the AV data portions; and the file structure area includes an allocation information area in which a first allocation descriptor and a second allocation descriptor are recorded, the first allocation descriptor and the second allocation descriptor respectively representing locations of the first extent and the second extent, the information recording system apparatus comprising:

an AV file structure processing section for reading out the first allocation descriptor and the second allocation descriptor from the allocation information area so as to obtain location information of the first extent and the second extent; and an AV allocation structure processing section for reading out a leading sector and a last sector of each extent so as to obtain first time information corresponding to the leading sector and second time information corresponding to the last sector, wherein:

the AV allocation structure processing section reads out an edition point sector corresponding to a predetermined edition point so as to obtain third time information corresponding to the edition point sector; and the AV allocation structure processing section determines whether or not the AV data is continuously reproducible based on the first allocation descriptor, the second allocation descriptor, the first time information, the second time information, and the third time information.

* * * * *